June 30, 1953 R. LAPSLEY ET AL 2,643,674
MULTIPLE VALVE UNIT
Filed Nov. 30, 1950 3 Sheets-Sheet 1

INVENTORS.
ROBERT LAPSLEY
GEORGE L. TURNER
BY
ATTYS.

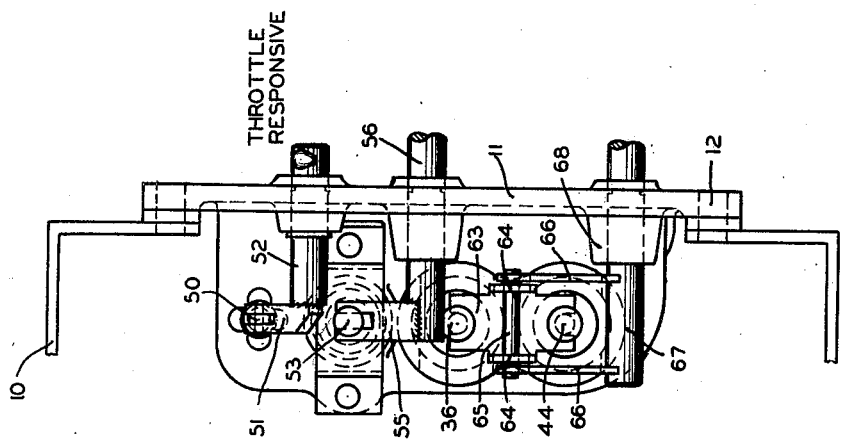
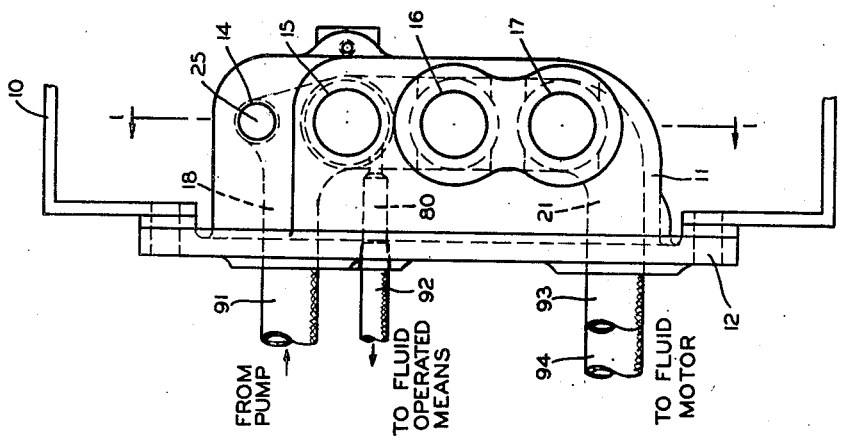

June 30, 1953 R. LAPSLEY ET AL 2,643,674
MULTIPLE VALVE UNIT
Filed Nov. 30, 1950 3 Sheets-Sheet 3

INVENTORS.
ROBERT LAPSLEY
GEORGE L. TURNER
BY
ATTYS.

Patented June 30, 1953

2,643,674

UNITED STATES PATENT OFFICE 2,643,674

MULTIPLE VALVE UNIT

Robert Lapsley and George L. Turner, Buchanan, Mich., assignors to Clark Equipment Company, Buchanan, Mich., a corporation of Michigan Application November 30, 1950, Serial No. 198,454

8 Claims. (Cl. 137—621)

Our invention relates generally to fluid pressure developing systems, and, more specifically, is directed to a control mechanism for fluid pressure developing systems.

It is an object of our present invention to provide a control mechanism for a fluid pressure developing system which will control the direction of drive of a fluid motor by selectively either admitting fluid under pressure to one side of the fluid motor while bleeding fluid pressure from the other side, or admitting fluid under pressure to the other side of the fluid motor while bleeding fluid pressure from the one side.

It is another object of our present invention to provide a control mechanism, of the character noted above, through which the flow of fluid under pressure may be selectively directed either to the fluid motor or to other auxiliary fluid operated devices.

By way of exemplification, the control mechanism of our present invention may be incorporated with an industrial truck, in which case fluid under pressure may be selectively directed, by means of the control mechanism, either to the fluid drive motor for powering the truck or to various auxiliary fluid operated devices embodied with the truck.

It is still another object of our present invention to provide a control mechanism which is adapted to gradually build up the pressure of the fluid flowing to either the fluid motor or the auxiliary fluid operated devices.

The aforementioned object is accomplished by providing means for metering the flow of fluid between the inlet fluid passageway and the sump housing of the fluid pressure developing system. As the volume of fluid metered to the sump housing is reduced, the pressure of fluid within the control mechanism is increased. This method of controlling the pressure of the fluid flowing to the fluid motor, provided for powering the industrial truck, permits the latter to be "inched" either forwardly or rearwardly while engaging or depositing loads. Furthermore, this method of controlling the pressure of the fluid flowing to the auxiliary fluid operated devices permits the operator of the truck to maintain accurate and precise control over the actuation of the devices.

It is still another object of our present invention to eliminate return fluid lines or hoses between the control mechanism and the sump housing of the fluid pressure developing system.

We have accomplished the aforementioned object by providing a control mechanism comprising a valve housing having axially movable valves mounted therein, which valve housing is disposed within the sump housing. This construction eliminates return fluid lines or hoses between the valve and sump housings.

It is a still further object of our invention to reduce to a minimum leakage of fluid past the control shafts, which are operatively connected to the valves and extend outwardly of the valve housing.

In conventional control mechanisms, the control shafts are rectilinearly movable which permits fluid to leak out of the valve housing past the control shafts when the latter are moved rectilinearly. In order to reduce fluid leakage of this nature, we propose to rotatably mount the control shafts in the valve housing.

Now, in order to acquaint those skilled in the art with the manner of constructing and using the devices of our present invention, we shall describe, in connection with the accompanying drawings, a preferred embodiment of our invention.

In the drawings:

Figure 2 is a vertical sectional view of the control mechanism of our present invention, taken along the line 2—2 in Figure 1, looking in the direction indicated by the arrows;

Figure 1:
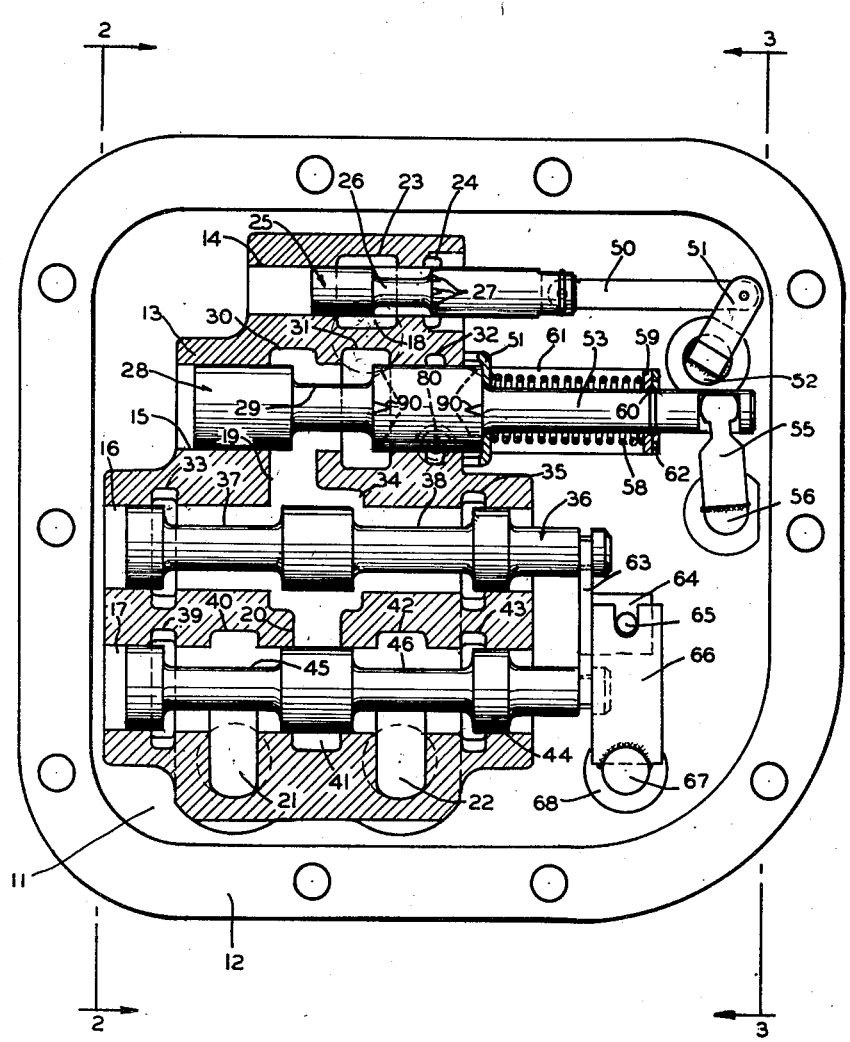
Figure 1 is a vertical sectional view of the control mechanism of our present invention, taken along the line 1—1 in Figure 2, looking in the direction indicated by the arrows.
Figure 4:
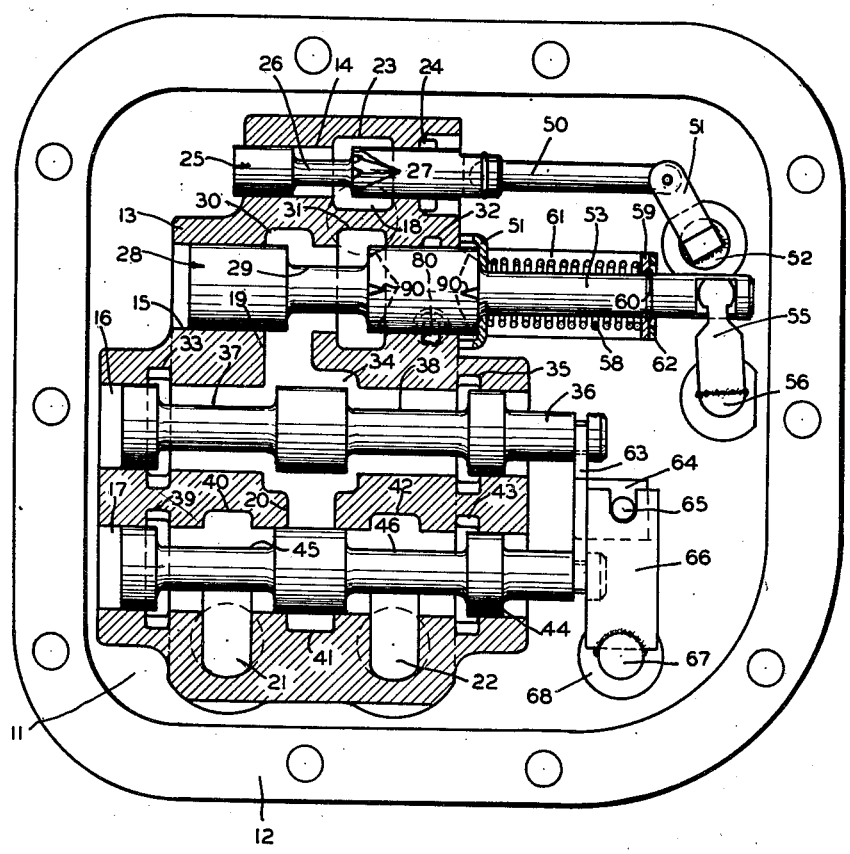

Figure 3 is a vertical sectional view of the control mechanism of our present invention, taken along the line 3—3 in Figure 1, looking in the direction indicated by the arrows; and Figure 4 is a vertical sectional view of the control mechanism of our present invention, taken along the line 1—1 in Figure 2, looking in the direction indicated by the arrows, showing one of the valves shifted from the position shown in Figure 1.

Referring now to the drawings, there is shown a portion of a fluid supply tank or housing, indicated by the reference numeral 10. A generally rectangular-shaped opening is formed in the side of the housing 10, through which is disposed a valve housing 11. The valve housing 11 is formed with a radially extending circumferentially continuous flange portion 12, which is suitably secured to the outer surface of the housing 10.

Formed integrally with the valve housing 11, on the interior thereof, is a valve block 13, in which is formed four horizontal parallel vertically spaced cylindrical openings 14, 15, 16, and 17.

Formed in the periphery of the cylindrical opening 14 are a pair of axially spaced annular grooves 23 and 24. Disposed in the cylindrical opening 14 is a slide valve 25 which has an annular channel 26 formed therein. The annular channel 26 is adapted to place the annular grooves 23 and 24 in communication when the valve member 25 is disposed in the position shown in Figure 1. A plurality of V-shaped notches 27 are formed in the valve member 25, adjacent one end of the annular channel 26, for a purpose to be more fully described hereinafter.

Disposed in the cylindrical opening 15 is a slide valve 28 which is formed with an annular channel 29. Formed in the periphery of the opening 15 are three axially spaced annular grooves 30, 31, and 32. The annular channel 29 in the valve member 28 is adapted to place the annular grooves 30 and 31 in communication when the slide valve 28 is disposed in the position shown in Figures 1 and 4. When the valve member 28 is shifted to the left, from the position shown in Figures 1 and 4, the annular grooves 31 and 32 are placed in communication.

Formed in the periphery of the cylindrical opening 16 are three axially spaced annular grooves 33, 34, and 35. Disposed in the opening 16 is a slide valve member 36 which has a pair of axially spaced annular channels 37 and 38 formed therein. When the valve member 36 is disposed in the position shown in Figures 1 and 4, the annular grooves 33 and 34 are placed in communication by the annular channel 37. Simultaneously, the annular grooves 34 and 35 are placed in communication, through the annular channel 38. When the valve member 36 is shifted either to the left or to the right from the position shown in Figures 1 and 4, communication between the annular grooves 33 and 34, and 34 and 35 is interrupted.

Formed in the periphery of the cylindrical opening 17 are five axially spaced annular grooves 39, 40, 41, 42, and 43. Disposed in the opening 17 is a slide valve member 44 which has a pair of axially spaced annular channels 45 and 46 formed therein. When the valve 44 is disposed in the position shown in Figures 1 and 4, annular channel 45 places the annular grooves 39 and 40 in communication, and the annular channel 46 places the annular grooves 42 and 43 in communication. When the valve 44 is shifted to the right from the position shown in Figures 1 and 4, the annular channel 45 places the annular grooves 40 and 41 in communication, and the annular channel 46 places the annular grooves 42 and 43 in communication. When the valve 44 is shifted to the left from the position shown in Figures 1 and 4, the annular channel 45 places the annular grooves 39 and 40 in communication, and the annular channel 46 places the annular grooves 41 and 42 in communication.

The annular groove 24 formed in the opening 14, the annular grooves 33 and 35 formed in the opening 16, and the annular grooves 39 and 43 formed in the opening 17 each communicate with the interior of the fluid supply housing 10. The annular groove 23 formed in the opening 14 and the annular groove 31 formed in the opening 15 each communicates with one end of a horizontal fluid passageway 18 formed in the valve block 13. The axis of passageway 18 extends perpendicular to the axes of the cylindrical openings 14 and 15. The passageway 18 at its other end opens outwardly of the valve housing 11 and fluid supply housing 10, and is adapted to be placed in communication with a source of fluid under pressure through a suitable hose line 91. The annular groove 32 communicates with a horizontal fluid passageway 80 which opens outwardly of the valve housing 11 and fluid supply housing 10. The passageway 80 is adapted to be placed in communication with various auxiliary fluid operated devices, through a hose line 92, for a purpose to be fully described hereinafter. The annular groove 30 formed in the opening 15 and the annular groove 34 formed in the opening 16 are placed in communication through a fluid passageway 19 formed in the valve block 13. The annular groove 34 formed in the opening 16 and the annular groove 41 formed in the opening 17 are placed in communication through a fluid passageway 20 formed in the valve block 13. The annular grooves 40 and 42 communicate, respectively, with fluid passageways 21 and 22 which extend outwardly of the valve housing 11 and fluid supply housing 10. The fluid passageways 21 and 22 are adapted to be placed in communication with a conventional fluid motor (not shown), through suitable fluid hoses 93 and 94, for driving the same. When fluid is admitted to the fluid motor, through the passageway 21 and hose 93, the motor is adapted to be driven in one direction, and when fluid is admitted to the fluid motor, through the fluid passageway 22 and hose 94, the motor is adapted to be driven in the opposite direction.

The valve member 25, adjacent its one end, is suitably connected to the one end of a link member 50, which link member 50 at its other end is pivotally mounted to the bifurcated outer end of a crank arm 51, fixedly mounted to the one end of a horizontal shaft 52, suitably journaled for rotation in the wall of the fluid supply housing 11. The shaft 52 extends outwardly of the valve housing 11 and fluid supply housing 10. Rotation of shaft 52 causes rotation of crank arm 51 which, in turn, effects rectilinear movement of the link 50 and the valve member 25.

The valve member 28 has a reduced end portion 53, which at its outer end is formed with flatted portions adapted to be received by the bifurcated outer end of a crank arm 55. The crank arm 55 is secured to a shaft 56 which is journaled for rotation in a boss formed in the wall of the valve housing 11 and extends outwardly of the valve housing 11 and the fluid supply housing 10. Upon rotation of the shaft 56, the crank arm 55 rotates causing rectilinear movement of the valve member 28 within the opening 15. Disposed concentrically about the reduced end 53 of the valve member 28 is a flange member 57 which normally abuts against one side of the valve block 13, adjacent the opening 15. Also disposed concentrically about the reduced end 53 is a coil spring 58, which at its one end abuts against the flange member 57 and at its opposite end abuts against a washer 59 held against axial movement in one direction, with respect to the reduced end 53, by means of a retaining ring 60. The flange member 57 is formed with a bracket portion 61 which extends generally parallel to the axis of the valve member 28. The bracket portion 61 at its outer end is formed with a laterally extending portion 62 which is disposed outwardly of the washer member 59 for providing a stop therefor. The spring 58 normally biases the valve member 28 to the position shown in Figures 1 and 4.

One pair of adjacent ends of the valve members 36 and 44 are interconnected by means of a bracket member 63, which is provided, adjacent its ends, with bifurcated portions disposed in annular channels formed in the valve members 36 and 44. The valves 36 and 44 are thus adapted for conjoint movement. The bracket member 63 is provided with laterally extending spaced apart ear portions 64 in which is journaled a pin member 65. The pin member 65 extends laterally outwardly at the sides of the ear portions 64, and the ends are adapted to be received in the bifurcated ends of a pair of spaced apart crank arms 66 fixed to a shaft 67, which is rotatably journaled in a boss 68 formed integrally with the side of the valve housing 11. The shaft 67 extends outwardly of the valve housing 11 and the fluid supply housing 10. Clockwise rotation of the shaft 67 causes clockwise rotation of the crank arms 66, which, in turn, effects rectilinear movement of the bracket 63 and valve members 36 and 44 to the right from the position shown in Figures 1 and 4. Counterclockwise rotation of the shaft 67 causes counterclockwise rotation of the crank arms 66, which, in turn, effects rectilinear movement of the bracket 63 and valve members 36 and 44 to the left from the position shown in Figures 1 and 4.

By way of exemplification and not limitation, we shall now describe the operation of the control mechanism of our present invention when it is incorporated with an industrial truck. An industrial truck, of the type to which we make reference, is provided with a prime mover, a fluid pump adapted to be driven therefrom, a fluid motor adapted to be driven from the fluid pump, and various auxiliary fluid operated devices. The inlet of the fluid pump is suitably connected to the fluid sump or housing 10, and the outlet of the fluid pump communicates with the passageway 18 in the valve block 13, through hose line 91. As aforedescribed, the fluid motor is connected to the pair of passageways 21 and 22 in the valve block 13, through hose lines 93 and 94. The shaft 52 of our control mechanism is adapted to be connected to the throttle of the prime mover, through suitable linkage means, in such a manner that a change in throttle position effects rotation of the shaft 52. The shaft 56 is adapted to be connected, through suitable linkage means, to a manually operable control lever, which is adapted to be manipulated by an operator of the truck. Likewise, the shaft 67 is adapted to be connected, through suitable linkage means, to a manually operable control lever, which is also adapted to be manipulated by the operator of the truck.

When the prime mover is idling and the throttle is in a closed position, the shaft 52 and crank arm 51 are disposed in the position shown in Figure 1, with the valve member 25 in its extreme right position. When the engine is idling, the fluid under pressure delivered by the fluid pump to the passageway 18 is returned to the interior of the fluid supply housing 10, through the annular groove 23, annular channel 26 in the valve member 25, and the annular groove 24 in the opening 14. If the throttle of the prime mover is opened, causing a corresponding increase in speed, the linkage between the throttle and the shaft 52 causes the latter to rotate counterclockwise from the position shown in Figure 1. Counterclockwise rotation of the shaft 52, as aforedescribed, causes the valve member 25 to move to the left from the position shown in Figure 1. As the V-shaped notches 27, formed in the valve member 25, approach the one side of the annular groove 23, fluid is metered therepast from the annular groove 23 to the annular groove 24, thereby causing fluid pressure to increase gradually within the annular groove 23. Further movement of the valve member 25 to the left completely interrupts fluid flow from the annular groove 23 to the annular groove 24, and permits full fluid pressure to be delivered to the annular groove 31. When the valve member 25 is disposed in the position shown in Figure 4, the fluid under pressure, entering the fluid passageway 18, is directed through the annular groove 31 and annular channel 29 to the annular groove 30. From the annular groove 30, the fluid is transmitted through the fluid passageway 19 to the annular groove 34 formed in the opening 16. The fluid then flows through the annular channels 37 and 38 formed in the valve member 36 to the annular grooves 33 and 35 formed in the opening 16. As aforedescribed, the annular grooves 33 and 35 communicate with the interior of the fluid supply housing 10, and thus the fluid under pressure is returned to the interior of the fluid supply housing 10. With the valves 28, 36, and 44 in the position shown in Figures 1 and 4, the vehicle remains stationary irrespective of the position of the throttle.

If it is desired to effect drive to the vehicle, the operator need only select the suitable control lever to effect rotation of the shaft 67, and thereby effect rectilinear movement of the valve members 36 and 44. Assuming the valves 25 and 28 are in the position shown in Figure 4, movement of the valves 36 and 44 to the left from the position shown in Figure 4 interrupts fluid flow from the annular groove 34 to the annular grooves 33 and 35, and places the annular groove 34 in communication with the fluid passageway 22 through the fluid passageway 20, annular groove 41, annular channel 46, and annular groove 42, thereby delivering fluid under pressure through hose line 94 to one side of the fluid motor for driving the same in one direction. Simultaneously, fluid passageway 21 is placed in communication with the interior of the fluid supply housing 10 through annular groove 40, annular channel 45, and annular groove 39, thereby bleeding fluid from the other side of the fluid motor, through hose line 93.

If it should be desired to drive the fluid motor in the opposite direction, the suitable control lever is actuated by the operator and the shaft 67 is rotated clockwise from the position shown in Figure 4, thereby causing the valves 36 and 44 to shift rectilinearly to the right from the position shown in Figures 1 and 4. When the valves 36 and 44 are moved to the right, the annular groove 34 is placed in communication with the fluid passageway 21 through the fluid passageway 20, annular groove 41, annular channel 45, and annular groove 40, thereby delivering fluid under pressure, through hose line 93, to the other side of the fluid motor for driving the same in the opposite direction. Simultaneously, fluid passageway 22 is placed in communication with the interior of the fluid supply housing 10 through annular groove 42, annular channel 46, and annular groove 43, thereby bleeding fluid from the one side of the fluid motor through hose line 94.

From the foregoing description, it will be seen that when the valves 36 and 44 are shifted to the left from the position shown in Figures 1 and 4, drive is effected to the fluid motor in one direction, and when the valves 36 and 44 are shifted to the right from the position shown in Figures 1 and 4, drive to the fluid motor is effected in the opposite direction.

If the valves 36 and 44 are moved either to their extreme right or left position, with the valves 25 and 28 in the position shown in Figure 1, the truck may be "inched" forwardly or rearwardly, depending on the position of the valves 36 and 44, by slowly opening the throttle of the prime mover. Opening the throttle, as previously described, causes the V-shaped notches 27 to approach the one side of the annular groove 24 so as to meter fluid flow between the annular grooves 23 and 24. Fluid pressure is thus gradually built up within the annular channel 31, from which fluid is ultimately delivered to the fluid motor.

If it should be desired to deliver fluid under pressure to one of the hydraulic fluid operated devices associated with the truck, the shaft 56 may be rotated which causes the valve member 28 to be moved rectilinearly to the left. Movement of the valve 28 to the left interrupts fluid flow between the annular grooves 31 and 30, and places the annular grooves 31 and 32 into communication. As aforedescribed, the annular groove 32 has connection with a fluid passageway 80, which may be placed in communication, through hose line 92, with one or more of the fluid operated devices of the industrial truck. A plurality of V-shaped notches 99 are formed in the valve member 28 for metering fluid flow from the annular groove 31 to the annular grooves 30 and 32, when the valve 28 is shifted rectilinearly in the opening 15. The V-shaped notches permit the fluid pressure to increase gradually in the grooves 30 and 32 upon initial delivery thereto. The auxiliary fluid operated devices are, like the fluid motor, responsive to throttle position. That is, when the throttle is closed and valve 25 is in the position shown in Figure 1, fluid developed by the pump is returned to the sump housing 10 and no pressure is built up in groove 31 for actuating the auxiliary devices. However, as the throttle is opened and the valve 25 moves to the position shown in Figure 4, fluid pressure is built up in groove 31 for effecting actuation of the auxiliary devices.

From the foregoing description, it will be realized that since the valve housing 11 is disposed within the confines of the fluid supply housing 10, it is unnecessary to provide additional fluid passageways or drain lines for returning the fluid from the valve block 13 to the sump housing 10. It will also be seen that since the valve block 13 is disposed within the sump housing 10, no fluid is lost through leakage past the valve members 25, 28, 36, and 44, as such fluid is returned directly to the sump.

In the conventional forms of control systems with which we are familiar, it is the general practice to provide rectilinearly movable control levers which extend outwardly of the control housing. This type of construction permits considerable oil to escape past the control levers when the latter are actuated rectilinearly. The control shafts 52, 56, and 67 which project exteriorly of the valve housing 11 and sump housing 10 are rotatably mounted in the housing 11, and thus oil leakage past the control shafts is reduced to a minimum.

While we have shown and described what we believe to be a preferred embodiment of our present invention, it will be understood that various rearrangements and modifications may be made therein without departing from the spirit and scope of our present invention.

We claim:

1. A control mechanism for use with a sump housing, a fluid pump and a fluid motor comprising, a valve block having first, second and third openings formed therein, first and second axially spaced annular grooves formed in said valve block coaxially of said first opening, third, fourth and fifth axially spaced annular grooves formed in said valve block coaxially of said second opening, sixth, seventh, eighth, ninth and tenth axially spaced annular grooves formed in said valve block coaxially of said third opening, an inlet fluid passageway in said valve block communicating at one end thereof with said first annular groove and at the other end thereof being adapted to be connected to the fluid pump, said second, third, fifth, sixth and tenth annular grooves being adapted to be placed in communication with the sump housing, first fluid passageway means in said valve block communicating at one end thereof with said inlet fluid passageway and at the other end thereof communicating with said fourth annular groove, second fluid passageway means in said valve block communicating at one end thereof with said seventh annular groove and at the other end thereof being adapted to be connected to the fluid motor, third fluid passageway means in said valve block communicating at one end thereof with said ninth annular groove and at the other end thereof being adapted to be connected to the fluid motor, fourth fluid passageway means in said valve block communicating at one end with said fourth annular groove and at the other end thereof communicating with said eighth annular groove, a first rectilinearly movable valve disposed in said first opening and having a first annular channel formed therein, a second rectilinearly movable valve disposed in said second opening and having second and third axially spaced annular channels formed therein, a third rectilinearly movable valve disposed in said third opening and having fourth and fifth axially spaced annular channels formed therein, said second valve in one position being adapted to place said third, fourth and fifth annular grooves in communication through said second and third annular channels, said third valve being adapted in one position to place said sixth and seventh annular grooves in communication through said fourth annular channel and said ninth and tenth annular grooves in communication through said fifth annular channel, said third valve being adapted in a second position to place said seventh and eighth annular grooves in communication through said fourth annular channel and said ninth and tenth annular grooves in communication through said fifth annular channel, said third valve being adapted in a third position to place said sixth and seventh annular grooves in communication through said fourth annular channel and said eighth and ninth annular grooves in communication through said fifth annular channel, and said first valve in one position being adapted to place said first and second annular grooves in communication through said first annular channel.

2. The control mechanism of claim 1 wherein said valve block is disposed within the sump housing and said second, third, fifth, sixth and tenth annular grooves open into the sump housing.

3. The control mechanism of claim 2 including rotatably mounted control shafts projecting outwardly of the sump housing, and said control shafts being operatively connected to said first, second, and third valves for effecting rectilinear movement of the latter.

4. The control mechanism of claim 1 wherein circumferentially spaced notches are formed in said first valve adjacent one end of said first annular channel for metering fluid flow between said first and second annular grooves.

5. A control mechanism for use with a sump housing, a fluid pump, a fluid motor, and auxiliary fluid operated devices comprising, a valve block having first, second, third and fourth cylindrical openings formed therein, first and second axially spaced annular grooves formed in said valve block coaxially of said first opening, third, fourth and fifth axially spaced annular grooves formed in said valve block coaxially of said second opening, sixth, seventh and eighth axially spaced annular grooves formed in said valve block coaxially of said third opening, ninth, tenth, eleventh, twelfth and thirteenth axially spaced annular grooves formed in said valve block coaxially of said fourth opening, an inlet fluid passageway in said valve block communicating at one end thereof with said first and fourth annular grooves and at the other end thereof being adapted to be connected to the fluid pump, said second, sixth, eighth, ninth and thirteenth annular grooves being adapted to be placed in communication with the sump housing, a first fluid passageway in said valve block communicating at one end thereof with said third annular groove and at the other end thereof communicating with said seventh annular groove, a second fluid passageway formed in said valve block communicating at one end thereof with said seventh annular groove and at the other end thereof communicating with said eleventh annular groove, a third fluid passageway formed in said valve block communicating at one end thereof with said tenth annular groove and at the other end thereof being adapted to be connected to the fluid motor, a fourth fluid passageway formed in said valve block communicating at one end thereof with said twelfth annular groove and at the other end thereof being adapted to be connected to the fluid motor, a fifth fluid passageway formed in said valve block communicating at one end thereof with said fifth annular groove and at the other end thereof being adapted to be connected to the fluid operated devices, a first rectilinearly movable valve disposed in said first opening and having a first annular channel formed therein, a second rectilinearly movable valve disposed in said second opening and having a second annular channel formed therein, a third rectilinearly movable valve disposed in said third opening and having third and fourth axially spaced annular channels formed therein, a fourth rectilinearly movable valve disposed in said fourth opening and having fifth and sixth axially spaced annular channels formed therein, said second valve in one position being adapted to place said third and fourth annular grooves in communication through said second annular channel and in another position being adapted to place said fourth and fifth annular grooves in communication through said second annular channel, said third valve in one position being adapted to place said sixth, seventh and eighth annular grooves in communication through said third and fourth annular channels, said fourth valve being adapted in one position to place said ninth and tenth annular grooves in communication through said fifth annular channel and said twelfth and thirteenth annular grooves in communication through said sixth annular channel, said fourth valve being adapted in a second position to place said tenth and eleventh annular grooves in communication through said fifth annular channel and said twelfth and thirteenth annular grooves in communication through said sixth annular channel, said fourth valve being adapted in a third position to place said ninth and tenth annular grooves in communication through said fifth annular channel and said eleventh and twelfth annular grooves in communication through said sixth annular channel, and said first valve in one position being adapted to place said first and second annular grooves in communication through said first annular channel.

6. The control mechanism of claim 5 wherein said valve block is disposed within the sump housing and said second, sixth, eighth, ninth and thirteenth annular grooves open into the sump housing.

7. The control mechanism of claim 5 wherein circumferentially spaced notches are formed in said first valve adjacent one end of said first annular channel for metering fluid flow between said first and second annular grooves.

8. A control mechanism, for use with a sump housing, a fluid pump and a fluid motor, comprising a valve block having first, second and third openings formed therein, inlet fluid passageway means in said valve block communicating at one end thereof with said first and second openings, said inlet fluid passageway means at the other end thereof being adapted to be connected to the fluid pump, first fluid passageway means in said valve block communicating at one end thereof with said second opening and at the other end thereof communicating with said third opening, second fluid passageway means in said valve block communicating at one end thereof with said third opening and at the other end thereof being adapted to be connected to the fluid motor, third fluid passageway means in said valve block communicating at one end thereof with said third opening and at the other end thereof being adapted to be connected to the fluid motor, a first rectilinearly movable valve disposed in said first opening, a second rectilinearly movable valve disposed in said second opening, a third rectilinearly movable valve disposed in said third opening, said second valve in one position being adapted to place said inlet fluid passageway means and said first fluid passageway means in communication with said sump housing, said third valve being adapted in one position to place said first fluid passageway means in communication with said second fluid passageway means and said third fluid passageway means in communication with the sump housing, said third valve being adapted in a second position to place said first fluid passageway means in communication with said third fluid passageway means and said second fluid passageway means in communication with the sump housing, said third valve being adapted in a third position to place said second and third fluid passageway means in communication with said sump housing, and said first valve in one position being adapted to place said inlet fluid passageway means in communication with said sump housing.

ROBERT LAPSLEY.
GEORGE L. TURNER.

References Cited in the file of this patent

UNITED STATES PATENTS

| Number | Name | Date |
| --- | --- | --- |
| 1,943,061 | Douglas | Jan. 9, 1934 |
| 2,221,462 | Trambly | Nov. 12, 1940 |
| 2,244,213 | Patton | June 3, 1941 |
| 2,247,140 | Twyman | June 24, 1941 |
| 2,359,802 | Stephens | Oct. 10, 1944 |